Oct. 16, 1951   G. H. COLE ET AL   2,571,422
TEMPERATURE RESPONSIVE DEVICE
Filed Jan. 3, 1950
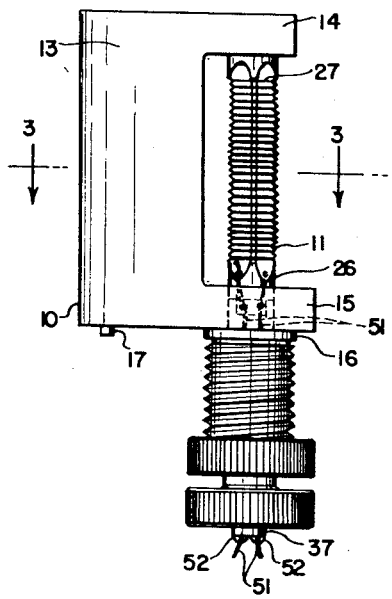
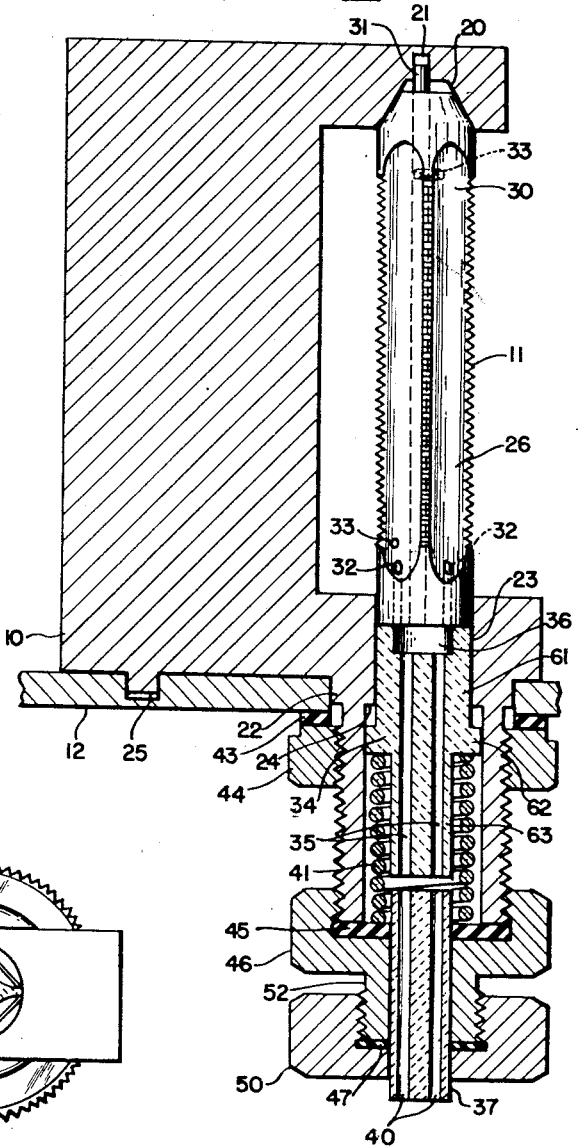
Inventor
GEORGE H. COLE — ROBERT A. HOEL
HAROLD E. NEUENDORF
CLAYTON L. CORNEABY
By George H Fisher
Attorney Patented Oct. 16, 1951

2,571,422

UNITED STATES PATENT OFFICE 2,571,422

TEMPERATURE RESPONSIVE DEVICE

George H. Cole, Robert A. Hoel, Harold E. Neuendorf, and Clayton L. Corneaby, Minneapolis, Minn., assignors to Minneapolis-Honeywell Regulator Company, Minneapolis, Minn., a corporation of Delaware Application January 3, 1950, Serial No. 136,582

14 Claims. (Cl. 201—63)

This invention is concerned with a resistance type temperature responsive device for measuring the temperature of high speed gas streams, particularly the highly heated gas streams such as are found in jet engines or gas turbines near the turbine wheels.

For thermodynamic reasons, it is desired to operate jet engines, gas turbines and the like at as high a temperature as possible but, due to limitations of the materials used for constructing such engines, a practical high limit of temperature must be observed. To further complicate the problem, the temperautres in the jet engines and gas turbines may vary rapidly so that a temperature responsive indicator or controller must respond rapidly to prevent the temperature from rising above the practical high limit and remaining there for an appreciable length of time. In addition to the very high and changing temperatures of the gas stream, foreign particles, formed largely of the products of combustion, have an abrasive or erosive effect upon anything in the path of the gas stream.

Heretofore the means for obtaining an indication of such temperatures by wire wound resistance type indicators have not been very satisfactory in that the wire wound element cannot be subjected to the direct gas stream because of the abrasive effects of the foreign particles upon the element. Also, the shields which have hitherto been devised for protecting the element tend to subject it to time delays which can be fatal to the engine.

It is therefore an object of this invention to provide an improved temperature responsive device for jet engines, gas turbines and the like.

It is a further object to provide a temperature responsive device capable of responding to very high temperatures and yet be sturdy and dependable.

It is also an object to provide a temperature responsive device which is quickly responsive to changes in temperature and which may be used in erosive gas steams.

It is an additional object to provide a shield for a temperature responsive element which effectively protects the element from erosive particles and the like and which presents minimum interference with the gas steam in which the element is disposed.

It is a further object to provide a unitary temperature responsive device especially suited for high temperature work which is compact and rugged even though incorporating frangible members.

Briefly the present invention incorporates a streamline shield and support member for supporting a rapidly responding temperature responsive element in a gas stream, with provisions being made for compensating for the unequal expansion of the shield and support member and the element and for means to prevent twisting of the element in the support member.

For a better understanding of the invention and of further objects and advantages therein reference is had to the following detailed description taken in conjunction with the accompanying drawings in which:

Figure 1 is a side view of the assembly;

Figure 2 is a sectional elevation view of the assembly; and

Figure 3 is a cross sectional view taken on line 3—3 in Figure 1.

The present temperature responsive device comprises a shield and support member 10 and a temperature responsive element 11, with the element being mounted in the support member. The support member 10 is adapted for mounting on a wall 12 of a jet engine in a mounter to project into the heated gas stream of the engine so that the element 11 can respond to the temperatures of the gas.

The shield and support member comprises a shielding portion 13, an upper extension 14, a lower extension 15 from which extends an attaching portion 16 by which the shield and support member is attached to the chamber wall, and a lug 17.

The shielding portion of member 10 is shaped as a symmetrical airfoil which terminates at its forward end in a sharp angle so as to offer minimum resistance to the gas stream and to permit a smooth flow of gas along the surface of the shielding portion. The sides of the shielding portion are curved, as best seen in Figure 3, to form arcs of a circle but, obviously, any suitable streamlined shape should be satisfactory. The main consideration determining the shape of the shielding portion 13 is to avoid causing the gas stream which moves along the surface of the shielding portion to exceed the sonic speed limit. The shielding portion 13 is terminated at the point of greatest width, which occurs when the two sides become parallel to each other, to obtain the optimum condition between minimum turbulence and the shortest possible length of the shielding portion. At this point the gas streams moving along the sides of the shielding portion are moving in parallel paths with respect to the entire gas stream.

The upper support extension 14 extends straight back from the shield portion 13 so as to maintain a minimum interference to the gas stream and at the same time maintain a solid support for the temperature responsive element 11, to be described. The upper support extension 14 has a frustum-shaped depression 20 in its lower surface to receive the upper end of the element 11 and a hole 21 extends through the extension 14 at the bottom of the depression 20, this hole being off-centered with respect to the depression 20 for purposes to be hereinafter explained.

The lower support extension 15 extends straight back from the shielding portion 13, and, as best seen in Figure 3, is of the same width as the maximum width of the shielding portion 13, to obtain minimum interference to the passage of the gas stream and at the same time maintain a solid support structure.

The attachment portion 16 is at right angles to, and preferably integral with, the lower support extension 15 and is made to fit through an aperture 22 in the chamber wall 12. A hole 23 extends through the attachment portion 16 and the lower support extension 15 with the hole in the attachment portion 16 having greater diameter than the hole in the extension 15 with the result that there is a shoulder 24 near where the attachment portion 16 joins the extension 15. The attachment portion 16 is externally threaded for purposes to be explained hereinafter.

The lug 17 is fixed to the bottom surface of shielding portion 13 and extends into a depression 25 in the chamber wall 12 to prevent the shield from turning in the gas stream. The shield 13, support portions 14 and 15 and attachment portion 16 are preferably cast as a single unit and, because the metals, such as vitallium which have been found suitable for this purpose are difficult to machine, precision casting such as by the lost wax process is highly desirable.

The temperature responsive element or bobbin 11 held by support portions 14 and 15 comprises a suitable core member 26 and a wire winding 27 wound about the core member, the wire having an appreciable temperature coefficient of resistance.

The core member 26 may be made of any suitable insulating material which will successfully withstand high temperatures, with moldable high temperature ceramics being preferred.

The core 26 is essentially cylindrical and has a slightly smaller diameter than the hole 23 in the lower support extension 15. One end of the core member 26 is shaped as a frustum of such dimension as to fit into the frustum shaped depression in the upper support extension 14, the other end of the core member extending into the hole 23 of the lower support extension 15. The main or intermediate portion of the core member is formed with four oppositely disposed flutes 30 with intervening ribs extending along substantially the length of the exposed portion of the member 26, with the flutes terminating near the ends of the member. The ribs thus formed are notched for spacing the turns of wire wound on the member and serve to keep the wire in place and to prevent the turns from touching each other when the wire expands upon being heated.

An off-centered longitudinal hole extends through the member 26 and is arranged to line up with hole 21 in extension 14. A metal rod 31 inserted in hole 21 and the hole in the core member 26 serves to strengthen the core member and hold it together in the event it should break despite the reenforcement. Because the rod 31 is positioned off-center with respect to the depression 20 and with respect to the core member 26, the core cannot turn about the rod. This prevents the core from twisting in its supports and thus prevents twisting, short circuiting or breaking of the ends of the wire extending from the core. The rod 31 is cemented in the core member at the lower end to hold it fixedly in position. The rod is thus free to expand and contract with respect to the core member due to different thermal coefficients of expansion. The upper end of hole 21 is preferably closed to insure that rod 21 remains in position. A rod made of Inconel has been found to retain its shape and strength under the high temperatures involved and is considered satisfactory for this purpose.

From the ends of two of the flutes 30 two holes 32 extend through the lower end of core member 26, these holes providing conduits for the temperature-sensitive wire 27 wound on said core. Two further holes 33 extend through ribs adjoining the flutes into which the first-mentioned holes extend. One of holes 33 is positioned at the lower end of the rib adjacent one of the first-mentioned holes 32 while the second hole 33 is positioned near the upper end of a rib adjoining the flute into which the other hole 32 extends. If desired, notches could, of course, be used in place of the holes 33. These holes 33 provide a convenient anchorage for the winding 27 on the core.

The wire 27 may be composed of any suitable material that will stand up under high temperatures and also have an appreciable and consistent temperature coefficient of resistance. Wires of platinum, rhodium, and platinum-rhodium alloys have been tried and found to work successfully for this purpose.

In assembling the element one end of wire 27 is threaded through one of the holes 32 and one of the holes 33 and is then wrapped about the core 26 in the notches provided for that purpose until the turns cover most of the length of the core. The wire is then threaded through the other hole 33 and the other hole 32. The ends of the wire 27 which extend from the holes 32 in the core 26 are kept as short as possible so that the portion of the wire outside the chamber has a minimum effect upon the total resistance of the wire.

A second ceramic member 34 is cylindrical in shape and is of three different diameters along its length. The first portion 61 of member 34 has a diameter similar to that of core 26 and fits in the upper and smaller diametered portion of hole 23. The second portion 62 of member 34 is larger in diameter and fits in the larger diametered lower portion of hole 23. The shoulder between the first and second portions of this ceramic member should not abut the shoulder 24 formed between the upper and lower portions of hole 23 but should be slightly spaced from said shoulder to permit expansion by member 16. The third portion 63 of member 34 has a smaller diameter than the second portion 62 to provide a spring abutment shoulder between the second and third portions of the member 34. A circular recess 36 is formed in the upper end of member 34 and a pair of holes 35 communicate with this recess and extend longitudinally through said member.

A third cylindrical ceramic member 37 has the same diameter as the third portion 63 of member 34 and has two holes 49 which extend longitudinally through the member and which align with the holes 35 in member 34.

Other parts used in the present device include a coiled spring 41, washers 43, 45 and 47 of asbestos or other suitable heat resisting materials, and nuts 44, 46, and 50. Inconel or other suitable high temperature spring material should be used for spring 41 because it, too, is subject to rather high temperature.

In assembling this device and attaching it to the chamber wall 12 the attachment portion 16 of the device is first inserted through the hole 22 in the chamber wall from the inside of the chamber, with the lug 17 being fitted into the depression 25 in the chamber wall. The asbestos washer 43 is passed over the end of the attachment portion 16 with the nut 44 then threaded over the attachment portion and against the washer 43 to compress the washer against the chamber wall 12. By this means the shield and support member 10 is held firmly in place in the chamber. Obviously, the shield and support member could be fastened in the above manner to a plate which would then be mounted over a hole provided for that purpose in the wall if the engine were designed to permit such installation.

Two conductors 51 which are to be connected to the ends of the temperature-sensitive wire 27 are passed through nut 50, washer 47, nut 46, washer 45, the holes 40 in ceramic member 37, the spring 41, and the holes 35 in ceramic member 34. The ends of conductors 51 are then welded to the ends of the resistance wire 27 at the base of the core member 26, as shown in Figure 1. The element 11 is then passed through the hole 23 in the attachment portion 16 and the lower support extension 15 until the frustum end of the core 29 fits into the frustumed depression 20 in the upper support extension 14 with the Inconel rod 31 within the core member 26 extending into the hole 21 in the upper support extension.

The second ceramic member 34 is then inserted into the hole 23 in the attachment portion 16 and lower support extension 15 until it butts against core member 26 with the welded connections between the conductors 51 and the temperature-sensitive wire 27 lying in the depression 35 in the end of ceramic member 34. If desired, a suitable cement may be used between members 34 and 26 to aid in preventing relative movement between the two members. The coiled spring 41 is inserted into the hole 23 in the attachment portion 16 until it abuts the shoulder between the second and third portions of ceramic member 34. Washer 45 is then placed against the end of attachment portion 16 and the nut 46 which is internally threaded to about half its thickness and which has an inwardly extending shoulder is threaded over the end of the attachment portion 16, thereby compressing spring 41 and washer 45 and resiliently holding members 11 and 34 in place.

The inwardly extending shoulder in nut 46 is terminated by a concentric hole passing through the center of the nut, this hole having a diameter slightly larger than the third ceramic member 37. Nut 46 has a threaded extension 52 centrally located along the nut at the end of the nut opposite the internally threaded portion.

The third ceramic member 37 is then inserted into nut 46 with clearance for expansion left between member 37 and the end of the second ceramic member 34 with the conductors 51 causing the holes 40 and 35 in the ceramic members 37 and 34 to line up with each other. The asbestos washer 47 is placed over the end of the extension 52 on nut 46 and nut 50, which is internally threaded through about half its depth, is threaded over the extension on nut 46. At the end of the threaded portion of nut 50 is an inwardly extending shoulder which terminates at a concentric hole in nut 50, this hole being large enough to receive ceramic member 37. Threading of the nut 50 on extension 52 of nut 46 compresses washer 47 against the end of the extension 52 and forces the washer laterally against the ceramic member 37 to hold the ceramic member fixedly in position both longitudinally and radially with the result that ceramic member 37 is prevented from rotating.

The conductors 51 extending from the hole 40 in ceramic 37 are preferably fused to the ceramic member 37 by glass beads 52, as shown in Figure 1.

As can be seen, the nut 46 is fixedly positioned with respect to the shield and support member 10 and thus provides a stationary base for spring 41. The spring pushes against ceramic member 34 to force the ceramic member against core member 26 to hold the frustumed end of the core member in the depression 20 in the upper support extension 14 of the shield and support member 10. Thus, despite the different coefficients of expansion of the shield and support member and the core member, the core member 26 is always held firmly in the depression 20. As seen in Figure 2, the ceramic member 34 may move in either direction from the position shown depending on which way the temperature may change.

Leakage of gas from the chamber is prevented at the chamber wall by washer 43 which is compressed against the chamber wall by nut 44 and from the bottom of nut 44 by cementing the bottom of the nut at the threaded joint. The gas is prevented from escaping from the end of the attachment portion 16 by means of washer 45 compressed against the end of the attachment portion by nut 46. It is also prevented from escaping from the end of the extension 52 of nut 46 by means of washer 47, which is compressed laterally. The gas stream is further prevented from escaping out the holes 35 and 40 in ceramic members 34 and 37 by means of the glass beads 52 which seal up the openings in the end of the ceramic member 37.

While a preferred embodiment of the invention has been described it will be apparent that modifications may be made within the scope of the invention as set forth in the appended claims.

We claim as our invention:

1. A resistance unit assembly for measuring temperatures of high speed gas streams in chambers comprising: a temperature sensitive resistance wire; an insulator member about which said wire is wound, said member being frustum shaped at a first end and being terminated at a second end just without the passage of the gas stream and having an off-centered hole passing longitudinally through the member; a second insulator member having a first end butting against the second end of the first member, said second member having a depression on the first end to permit connecting conductors having a low temperature coefficient of resistance to the wire and keep the wire terminals short; a shield for protecting the wire from the direct gas stream and shaped as a foil formed by the arcs of two circles and terminated at its point of greatest width, said shield having a first extension for supporting the first insulator member, said extension having a frustum shaped depression into which the frustumed end of the first member is positioned, said shield having a second extension fitting into a depression in the chamber wall, and having a third extension, externally threaded, passing through the chamber wall, said third extension being hollow and enclosing the second insulator member; a rod passing through the off-centered hole in said first member and through the first extension on said shield to strengthen said first member and prevent it from turning; internally threaded means cooperating with the third extension on said shield to hold said shield rigidly in position in the chamber; a spring acting against said second insulator member to hold the frustumed end of said first insulator member in the depression in the first extension on said shield; and a threaded cap over the end of the third extension on the shield to provide a base for the spring.

2. A device responsive to the temperatures of high speed gas streams comprising: a temperature sensitive resistor; a frangible bobbin for supporting said resistor; a shield for protecting the resistor from a unidirectional gas stream, said shield being shaped as a foil defined by the arcs of two circles and having a leading edge and terminated at its point of greatest width, said width being greater than the width of said bobbin, said bobbin being spaced from said point of greatest width in the direction opposite to the direction of the leading edge from said point of greatest width; means holding said bobbin in its spaced position with respect to said shield; and means for mounting said device.

3. A device responsive to the temperatures of high speed gas streams comprising: a temperature sensitive resistance wire; a frangible bobbin for supporting said wire, said bobbin having an off-centered hole passing longitudinally therethrough; a shield for protecting the wire from the direct gas stream, said shield having a depression to receive one end of said bobbin to hold said bobbin and prevent eccentric turning of said bobbin; a rod passing through the off-centered hole in the bobbin and fastened to said shield to strengthen said bobbin and prevent it from turning about its center; and means for holding said shield, bobbin and wire rigidly in position in the gas stream.

4. A device responsive to the temperatures of high speed gas streams comprising: a temperature sensitive resistance wire; a frangible bobbin for supporting said wire, said bobbin having an off-centered hole passing longitudinally therethrough; a shield for protecting the wire from the direct gas stream, said shield having a depression to receive one end of said bobbin to hold said bobbin and prevent eccentric turning of said bobbin, said shield being shaped as a foil formed by the arcs of two circles and terminated at its point of greatest width, said width being greater than the width of said bobbin, said bobbin being spaced downstream from said point of greatest width; a rod passing through the off-centered hole in the bobbin and through an extension on said shield to strengthen said bobbin and prevent it from turning about its center; and means for holding said shield, bobbin and wire rigidly in position in the gas stream.

5. A device responsive to the temperatures of high speed gas streams comprising: a temperature sensitive resistance wire; a frangible bobbin for supporting said wire, said bobbin being frustum shaped at one end; a shield for protecting the wire from the direct gas stream and having an extension for supporting the bobbin, said extension having a frustum shaped depression into which the frustumed end of said bobbin is positioned; and means for holding said shield, bobbin and wire rigidly in position in the gas stream.

6. A resistance unit assembly for measuring temperatures of high speed gas streams comprising: a temperature sensitive resistance wire; a frangible bobbin for supporting said wire, said bobbin having an off-centered hole passing longitudinally therethrough and having one end frustum shaped; a shield for protecting the wire from the direct gas stream and having an extension for supporting the bobbin, said extension having a frustum shaped depression into which the frustumed end of said bobbin is positioned; a rod passing through the off-centered hole in the bobbin and through the extension on said shield to strengthen said bobbin and prevent it from turning; and means for holding said shield, bobbin and wire rigidly in position in the gas stream.

7. A resistance unit assembly for measuring temperatures of high speed gas streams comprising: a temperature sensitive resistance wire; a frangible bobbin for supporting said wire, said bobbin having an off-centered hole passing longitudinally therethrough and having one end frustum shaped; a shield for protecting the wire from the direct gas stream, said shield being positioned in front of the bobbin in the path of the gas stream and shaped as a foil formed by the arcs of two circles and terminated at its point of greatest width, said shield having an extension for supporting the bobbin, said extension having a frustum shaped depression into which the frustumed end of said bobbin is positioned; a rod passing through the off-centered hole in the bobbin and through the extension on said shield to strengthen said bobbin and prevent it from turning; and means for holding said shield, bobbin and wire rigidly in position in the gas stream.

8. A resistance unit assembly for measuring temperatures of high speed gas streams comprising: a temperature sensitive resistance wire; a frangible bobbin for supporting said wire; a shield for protecting the wire from the direct gas stream, said shield having an extension for supporting the bobbin; and a spring for holding said bobbin against said extension despite different rates of expansion for changes in temperature between said shield and said bobbin.

9. A resistance unit assembly for measuring temperatures of high speed gas streams comprising: a temperature sensitive resistance wire; a frangible bobbin for supporting said wire, said bobbin being frustum shaped at one end; a shield for protecting the wire from the direct gas stream and having an extension for supporting the bobbin, said extension having a frustum shaped depression into which the frustumed end of said bobbin is positioned; and a spring for holding the frustumed end of said bobbin in the depression despite different rates of expansion for changes in temperature between said shield and said bobbin.

10. A resistance unit assembly for measuring temperatures of high speed gas streams comprising: a temperature sensitive resistance wire;

a frangible bobbin for supporting said wire, said bobbin having an off-centered hole passing longitudinally therethrough; a shield for protecting the wire from the direct gas stream and having an extension for supporting the bobbin; a rod passing through the off-centered hole in the bobbin and fastened to the extension to strengthen said bobbin and prevent it from turning; and a spring for holding said bobbin against said extension despite different rates of expansion for changes in temperature between said shield and said bobbin.

11. A resistance unit assembly for measuring temperatures of high speed gas streams comprising: a temperature sensitive resistance wire; a frangible bobbin for supporting said wire, said bobbin having an off-centered hole passing longitudinally therethrough and having one end frustum shaped; a shield for protecting the wire from the direct gas stream and having an extension for supporting the bobbin, said extension having a frustum shaped depression into which the frustumed end of said bobbin is positioned; a rod passing through the off-centered hole in the bobbin and through the extension on said shield to strengthen said bobbin and prevent it from turning; and a spring for holding the frustumed end of said bobbin in the depression despite different rates of expansion for changes in temperature between said shield and said bobbin.

12. A resistance unit assembly for measuring temperatures of high speed gas streams comprising: a temperature sensitive resistance wire; a first insulator member for supporting said wire, said member being terminated just without the passage of the gas stream; a second insulator member abutting said first member without the gas stream, one of said members having a depression in the abutting surface to permit connecting conductors having a low temperature coefficient of resistance to the temperature sensitive wire and keep the terminals of said temperature sensitive wire short, said depression serving to receive the connecting portions of said wires to thereby permit said insulator members to abut each other; a shield for protecting the wire from the direct gas stream; and means for holding said shield, insulator members and wire rigidly in position.

13. A resistance unit assembly for measuring temperatures of high speed gas streams comprising: a temperature sensitive resistance wire; insulator means for supporting said wire, said means including a member having a depression outside the gas stream but closely adjacent thereto to permit connecting conductors having a low temperature coefficient of resistance to the temperature sensitive resistance wire and keep the terminals of said temperature sensitive wire short; a shield for protecting the wire from the direct gas stream, said shield having an extension for supporting the insulator means; and a spring acting against said member to hold said insulator means in position.

14. A resistance unit assembly for measuring temperatures of high speed gas streams comprising: a temperature sensitive resistance wire; a first insulator member for supporting said wire, said member having one end frustum shaped and having the other end terminated just without the passage of the gas stream; a second insulator member abutting said first member without the gas stream, said second member having a depression in the abutting surface to permit connecting conductors having a low temperature coefficient of resistance to the temperature sensitive wire and keep the terminals of said temperature sensitive wire short; a shield for protecting the wire from the direct gas stream, said shield having an extension for supporting the first insulator member, said extension having a frustum shaped depression into which the frustumed end of the first member is positioned; and a spring operating on the second member and, through the second member, on the first member to hold the frustumed end of said first member in the depression despite different rates of expansion for changes in temperature between said shield and said first member.

GEORGE H. COLE.
ROBERT A. HOEL.
HAROLD E. NEUENDORF.
CLAYTON L. CORNEABY.

REFERENCES CITED

The following references are of record in the file of this patent:

UNITED STATES PATENTS

| Number | Name | Date |
|---|---|---|
| Re. 21,716 | Bacon | Feb. 18, 1941 |
| 2,444,410 | Keinath | June 29, 1948 |

FOREIGN PATENTS

| Number | Country | Date |
|---|---|---|
| 610,317 | Great Britain | Oct. 14, 1948 |